United States Patent [19]

Wiegand et al.

[11] Patent Number: 4,885,587
[45] Date of Patent: Dec. 5, 1989

[54] MULTIBIT DECORRELATED SPUR DIGITAL RADIO FREQUENCY MEMORY

[75] Inventors: Richard J. Wiegand, Severna Park; Peter M. Buerger, Baltimore; Richard E. Marinaccio, Crofton, all of Md.

[73] Assignee: Westinghouse Electric Corp., Pittsburgh, Pa.

[21] Appl. No.: 288,376

[22] Filed: Dec. 22, 1988

[51] Int. Cl.$^4$ ................................................ G01S 7/38
[52] U.S. Cl. ........................................ 42/14; 342/15
[58] Field of Search ............... 342/13, 14, 15; 365/45, 365/191, 192, 197; 381/32; 369/59, 60; 333/165

[56] References Cited

U.S. PATENT DOCUMENTS

| | | |
|---|---|---|
| 3,947,827 | 3/1976 | Dautremont, Jr. et al. |
| 3,991,409 | 11/1976 | Dautremont, Jr. et al. |
| 4,017,856 | 4/1977 | Wiegand. |
| 4,247,946 | 1/1981 | Mawhinney ........................... 455/1 |
| 4,328,496 | 5/1982 | White. |
| 4,547,727 | 10/1985 | Tsui et al. .......................... 324/79 D |
| 4,613,863 | 9/1986 | Mitchell ................................. 434/2 |
| 4,633,516 | 12/1986 | Tsui ..................................... 455/226 |
| 4,713,662 | 12/1987 | Wiegand ................................. 342/13 |
| 4,743,905 | 5/1988 | Wiegand ................................. 342/14 |

Primary Examiner—Thomas H. Tarcza
Assistant Examiner—John B. Sotomayor
Attorney, Agent, or Firm—W. G. Sutcliff

[57] ABSTRACT

A decorrelated spur digital radio frequency memory (DRFM) system stores incoming radio frequency (RF) signals in a digital memory and at some later time replicates these RF signals at the output. The input RF signal to be stored is mixed with a local oscillator (LO) signal, which is coded with a decorrelation waveform, to produce an intermediate frequency (IF) signal which is next digitized with a multibit analog-to-digital (A/D) converter. This data is stored in a digital memory and is later retrieved from the memory and converted back to an analog IF signal. The IF signal is then mixed with the coded LO to produce a replica of the original RF signal. The code on the LO is the same decorrelation waveform used to produce the input IF signal. The resultant RF output spectrum can be made to be spectrally clean, i.e., containing no spurious harmonic signals arising from the signal's quantization.

This invention has the significant benefit of allowing key design options to be selected, in particular such options include the number of bits per sample, the number of channels, and the decorrelation phase resolution to obtain the most appropriate cost, size, instantaneous bandwidth and spur level combination.

21 Claims, 2 Drawing Sheets

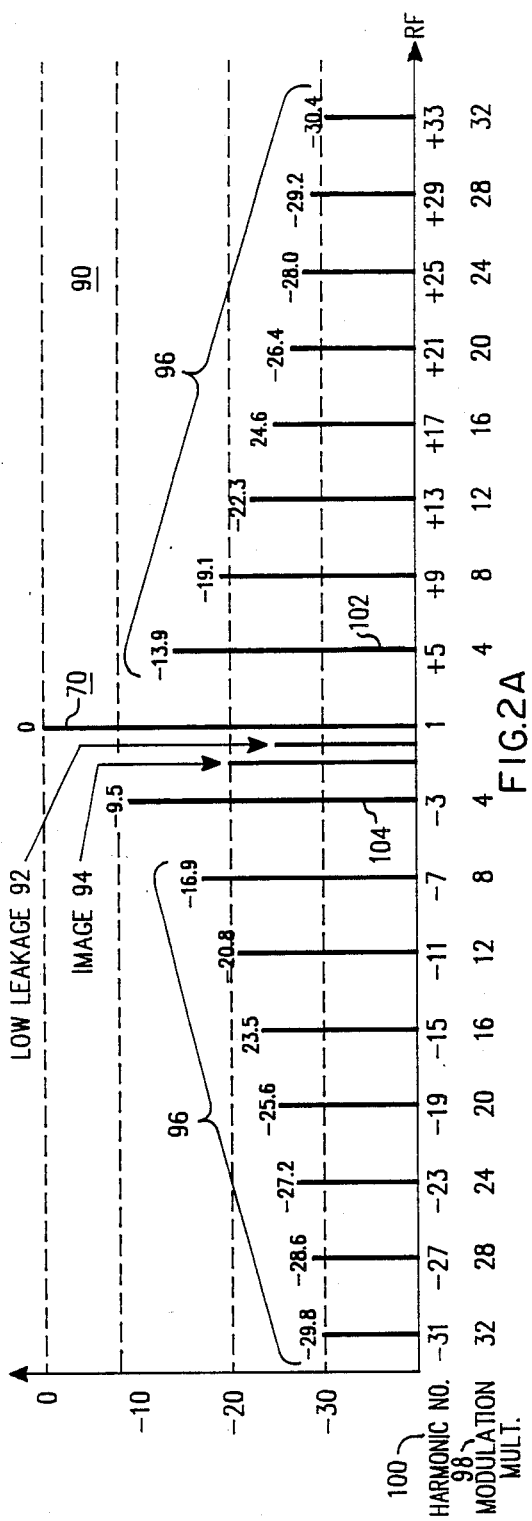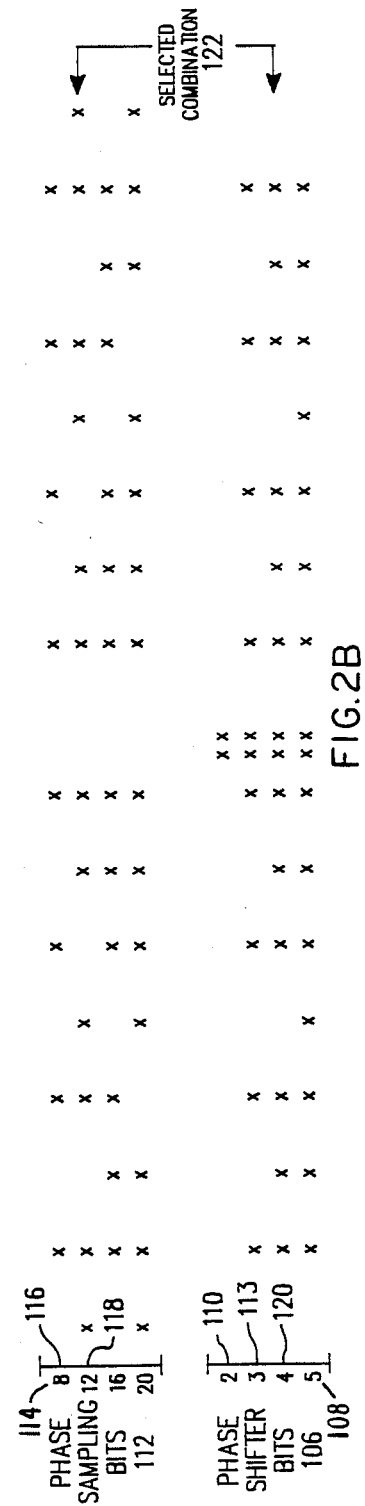
FIG.2A
FIG.2B

MULTIBIT DECORRELATED SPUR DIGITAL RADIO FREQUENCY MEMORY

BACKGROUND OF THE INVENTION

This invention relates, in general, to the reduction of the spurious signals created from the digital representation of analog signals. More specifically the invention relates to a technique which suppresses the spurious signals created from the quantization of an analog signal. Although the technique can be used to enhance the spur-free performance of any digital sampling/storage/reproduction system it is particularly useful in digital radio frequency memories (DRFM) which are suitable for the coherent storage and reproduction of radio frequency (RF) signals for use in military active electronic countermeasure systems, such as active radar jammers.

Active radar jammers are used in the field of electronic countermeasures to confuse or counter a system originating radar signals. In some situations, it is desirable to return signals to the radar system which are exact copies of the arriving radar signal. In other situations, it is desirable to return signals to the radar system which have characteristics other than that o the received radar signal in order to further confuse the originating radar system. In any event, it is usually necessary for the countermeasures system to store the received radar signal and reproduce it at a later time.

Previously, delay lines of various types have been used to effectively store the received radar signal for a short period and make the stored radar signal available at a later time. Typical delay lines, however, have the disadvantage that the delay cannot be electronically changed easily, and it is difficult to obtain a long delay without serious signal degradation. An improvement over delay line technology has been achieved by the use of digital radio frequency memories (DRFMs) which convert relatively high radio frequency (RF) signals down to a lower intermediate frequency (IF) by mixing the RF with a local oscillator (LO) signal; the resulting IF signal is then stored in a digital memory device. The digital memory can be controlled in a manner similar to the control of the digital memory of a computer. Stored values representing the radar signal can be recalled and reproduced at any desired time delay. Further, manipulation of the digital values to produce changes in the replicated signal are also conveniently done by digital processes.

U.S. Pat. No. 4,713,662 entitled "Modulated Digital Radio Frequency Memory", which was issued Dec. 15, 1987 in the name of Richard J. Wiegand, one of the inventor's herein, and which is assigned to Westinghouse Electric Corporation, the assignee herein, describes single and dual channel DRFMs. In either system it is necessary to first convert the RF signal down to a lower IF signal which is manageable. The IF signal is digitized by means of an analog-to-digital (A/D) converter at a given sampling rate which is determined by the capacity of the A/D equipment. The digitized signal is then stored in a digital memory. At a later time the digital signal may be called from memory and converted to an analog IF signal by a digital-to-analog (D/A) converter. The IF signal is mixed with the LO signal to convert the IF to the higher RF signal which is a replication of the incoming radar signal.

Although conversion of the incoming radar signal to a lower frequency IF signal allows more manageable manipulation of the information, a consequence of mixing signals is the production of two resulting signals which represent the sum and the difference of the original signal and the LO. In many situations the sum and the difference signals are easily distinguished. For example, if a 3100 MHz RF signal is mixed with a 3000 MHz LO signal, the resulting sum and difference signals are 6100 MHz and 100 MHz respectively. These signals are easily distinguished. In the DRFM the 6100 MHz signal is filtered out and the relatively low 100 MHz IF signal is digitized and stored in the memory. However, when the 100 MHz IF signal is recalled from memory and converted up to the RF level by mixing with the 3000 MHz LO signal, the original 3100 MHz RF signal representing the sum of the LO and IF is produced as well as a 2900 MHz image signal which represents the difference of the two. The image signal is not easily distinguished from the original signal. Thus, it is necessary to suppress the image signal.

The usual method of suppressing the image signal in DRFMs is to employ a two quadrature channel or so called I&Q memory system described in the above noted Wiegand patent. By using the two channel I&Q system the image signal can be suppressed or nearly cancelled at the output. However, I&Q systems have additional hardware components which can be expensive and heavy. Also, the described two channel system contains a non-performance region, or hole, which occurs when the frequency of the RF signal is close to the frequency of the LO of the memory system. This hole is caused by the low frequency gain roll off inherent in IF amplifiers.

According to the well known Nyquist Sampling Theory, the maximum usable instantaneous bandwidth (IBW) of a memory system is equal to one-half the sampling rate of the A/D converters used in the DRFM. Having a large instantaneous bandwidth (IBW) is advantageous from the standpoint that it allows radar signals over a wider range to be detected, stored and jammed by the countermeasures equipment. One way to maximize instantaneous bandwidth is to use one bit sampling.

One bit sampling also provides the advantages of increased amplitude dynamic range and reduced storage requirements. However, one bit sampling results in a large number of spurious frequencies or unwanted spectral lines (spurs) in the reproduced IF signal. The spurs are ultimately reproduced in the RF output signal when the IF is mixed to RF. Spurs degrade system performance and must be suppressed by some additional means.

Prior to Wiegand's invention, the most effective way to obtain reasonably large bandwidths and to suppress images was to use multiple bit sampling and the two channel I&Q system. Wiegand's patent shows that a single channel DRFM which has one bit sampling and phase or frequency modulation imposed on the LO signal can effectively reduce or decorrelate the image and spurs. However, certain higher order spurs may not be decorrelated if digitally generated phase modulation is used to modulate the LO.

In Wiegand's patent, four bit phase modulation is employed. The LO signal is phase modulated with a decorrelation waveform pattern which is later duplicated during replication of the RF output. However, pure digitally generated phase modulation will no decorrelate every spur line. Although modulation is imposed on every single potential spectral line, for some spectral lines the phase step results in a phase change in one or more multiples of 360°. Hence, the modulation is not effective and the spur line appears coherently in the output.

Multibit sampling is advantageous because it provides a more accurate picture of the incoming waveform. However, not all spurs are eliminated by a finite number of bits per sample because when the signal is reproduced it is not an exact replica of the incoming signal but an approximation with many harmonics which are spurious signals.

A disadvantage of multibit sampling is that it decreases the dynamic range of the system. This occurs because the input amplitude must be controlled to be within the maximum level of the sampler. In a one bit system, only positive and negative transitions are detected. In the multibit system, amplitude information is detected and quantized. In a multibit system, the amplitude is quantized because only a limited number of amplitude resolution bits or amplitude levels are available. Further, multibit systems require additional memory and a correspondingly more complex system of implementation. Further, multibit sampling reduces the instantaneous bandwidth of the system because of the slower sampling clocks used.

SUMMARY OF THE INVENTION

There is disclosed a digital radio frequency memory (DRFM) for use as a coherent radio frequency memory (CRFM) in a military electronic countermeasures system which provides harmonious combinations of the number of sampling and replication bits, the number channels and the resolution of a special modulation intended to decorrelate spurious spectral lines.

The DRFM comprises a digital memory, a multibit A/D converter connected to the input of the memory, a multibit D/A converter connected to the output of the memory, input and output mixers along with a local oscillator (LO) to downconvert and upconvert the RF signals, and a decorrelation modulation waveform generator and controller therefor. The incoming RF signal is applied to the input mixer along with the LO signal to produce an intermediate frequency (IF) signal. The LO signal is modulated according to the design of the decorrelation modulation controller before the LO signal is applied to the mixer. The resulting IF signal has the characteristics of both the incoming RF signal and the modulated LO signal. This IF signal is digitized by the multibit A/D converter. The resultant digital data stream is stored in the digital memory where it is held until the memory is commanded to transmit its data. The data is then retrieved and converted back into an IF signal by the D/A converter. This retrieved and reconstructed IF signal again contains information about the RF signal and the modulated LO signal. However, because of the quantization errors which arise from the analog to digital conversion process, the retrieved and reconstructed IF signal also contains other harmonic frequencies of the original IF signal. These harmonic frequency components become the spurious signals which are the inherent characteristic of the DRFM output signal spectrum. The retrieved and reconstructed IF signal is applied to the output mixer along with the LO signal which is modulated by the identical modulation waveform that was used to downconvert that particular RF signal. This mixing process removes the modulation imposed on the original RF signal, but does not remove the modulation from the spurious harmonic signals. The resultant output spectrum contains the replica of the incoming RF signal along with the decorrelated spurious harmonic signals.

The function of the decorrelation modulation is to spread the energy of these spurious signals in a manner that is most effective in suppressing the spurs. The preferred decorrelation modulation is a type of spreadspectrum modulation. Both phase modulation (PM) and frequency modulation (FM) may be employed as decorrelation modulations. When designing a decorrelation modulation certain considerations must be given to the coherency maintainable in the LO; the maximum bandwidth of the modulation versus the A/D sampling rate; potential receiver bandwidths; and the ability to exactly reproduce any portion of the decorrelation modulation.

The various embodiments of the invention depend upon the system design choices made in the following four areas:

(a) The number of IF channels;
(b) The number of bits of the A/D and D/A converters;
(c) The type of decorrelation modulation used, and the number states; and
(d) The number of digital memories per channel.

A two channel, in phase and quadrature phase (I & Q), system eliminates one-half of the output spurs in the DRFM output spectrum. However, it doubles the amount of IF and digital hardware required.

As the number of sampling bits used becomes greater, the spurious responses seen in the DRFM output spectrum become smaller. However, as the number of sampling bits gets larger, the maximum sampling rate drops, thereby reducing the instantaneous bandwidth (IBW) of the DRFM. Amplitude or phase sampling may be used to quantize the signal. The number of bits and the type of sampling results in spurious signals in the replica of the RF input signal.

PM offers wide modulation bandwidths, very good repeatability, and simplicity in design. However, some higher order spurious signals may not be suppressed unless the number of states of the PM is carefully selected in view of the effect. The order or harmonic number the spur has on the modulation seen on the spur. While FM suppresses all spurs it may be harder to control and duplicate and may affect the coherency of the LO.

Two or more digital memories may be connected to a single IF channel to create a simultaneous READ/WRITE capability in the DRFM. This capability adds complexity in both the memory and decorrelation modulation timing.

After these design choices have been made, a final system configuration can be realized. This invention covers the variety of embodiments which can be generated from the above design choices. In each of the above embodiments multibit sampling eliminates certain spurs from the DRFM output spectrum. Also, the decorrelation technique suppresses certain spurs from the DRFM output spectrum. Different spurs can be suppressed using each technique independently. When used in conjunction, a wider variety of spurious signals can be suppressed, thereby providing a more effective electronic countermeasure system.

BRIEF DESCRIPTION OF THE DRAWINGS

FIG. 2A is a graphical representation of the output spectrum of an exemplary I & Q channel DRFM that does not employ multibit sampling or the decorrelation technique. The output spectrum contains the input signal (the fundamental) and some of its related odd harmonics. Below each harmonic FIG. 2B are indications of which harmonics are suppressed as a result of operating the DRFM with a different number of A/D phase states (quantization levels) and different number of decorrelation modulation phase bits which may be implemented by the DRFM illustrated in FIG. 1.

DESCRIPTION OF THE INVENTION

Figure 1:
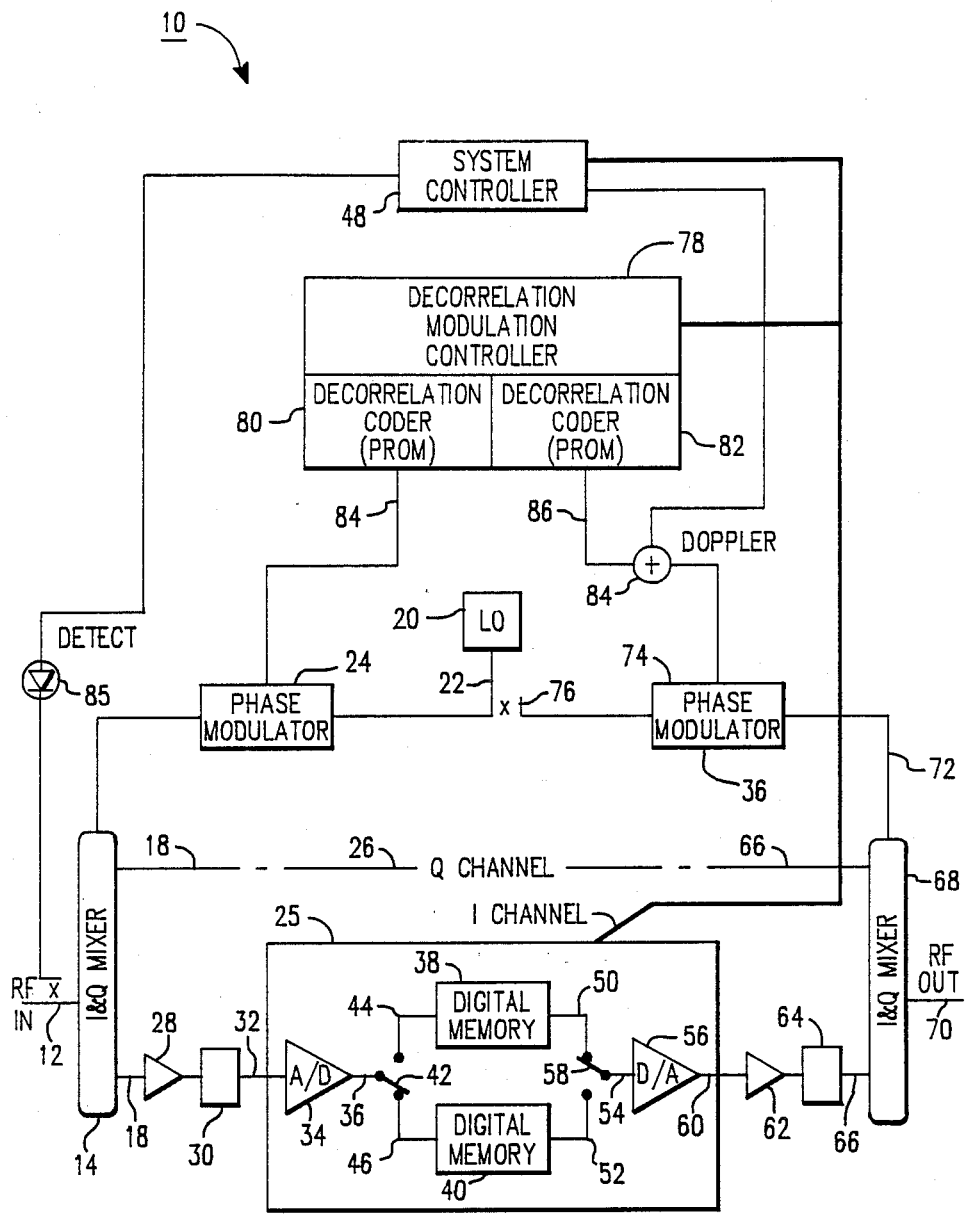
FIG. 1 is a schematic block diagram of an I & Q channel digital radio frequency memory (DRFM) incorporating multibit phase sampling, phase decorrelation modulation, and two digital memories per channel. Only the complete structure in the I channel is shown because the Q channel has an identical structure.

FIG. 1 is a schematic block diagram of an I & Q channel digital radio frequency memory (DRFM) incorporating multibit phase sampling, phase decorrelation modulation and multiple digital data storage in each channel.

An input RF signal 12 is applied to an I & Q input mixer 14. A modulated local oscillator signal 16 is mixed with the RF 12 to produce an IF signal 18 which appears at two outputs of the mixer 14 as shown. Local oscillator (LO) 20 produces LO signal 22 which is modulated, for example, by first phase modulator 24 to produce said modulated LO signal 16. In a preferred embodiment, the phase modulator 24 imposes a modulation waveform on the LO with a particular pattern of phase states. The pattern may have various discrete levels corresponding to certain phase angles. For example, a four phase state pattern is able to create four(4) 90° phase shifts in 360° of the LO. A twelve phase state pattern can create twelve(12) 30° phase shifts in 360° of the LO.

The I & Q system employs identical IF channels 25 and 26 respectively, only one of the channels, namely I channel 25, is hereafter described in detail. It should be understood that the system in FIG. 1 may be operated as a single channel DRFM by eliminating the Q channel 26 in its entirety.

The IF input signal 18 from the mixer 14 may be amplified and filtered by amplifier 28 and filter 30 before it is applied to the input 32 of a multibit A/D phase sampler 34. The output 36 thereof, in the form of digital words from the A/D converter 34, is stored in one of two digital memories 38-40 via switch 42 coupled to the inputs 44-46 of the respective memories 38-40. At some programmed later time, determined by a system controller 48, one of the memories 38-40 will produce digital data from its corresponding output 50,52 which is coupled to input 54 of the D/A converter 56 via switch 58. The D/A converter 56 produces an analog IF signal at its output 60 which may then be amplified and filtered by amplifier 62 and filter 64 before it is applied as the retrieved IF output signal 66 to the inputs of I&Q output mixer 68. In an I&Q system each IF signal 66 is converted in the mixer 68 to a replica of the input RF 12 by mixing the IF with a modulated LO signal 72 produced, for example, by a second phase modulator 74. The modulated LO signal 22 is applied to mixer 68 to produce RF output 70 which is a replica of the RF input 12. The phase modulator 74 is modulated with a pattern which is identical to the one used when the input RF 12 was mixed with the modulated LO 16 in the first or input mixer 14 used to downconvert the RF 12 to IF 18. The same pattern of decorrelation modulation must be used when the retrieved IF is mixed with the modulated LO 72 in the second or output mixer 68 used to upconvert the IF 66 to produce the replicated output RF 70 as was used when downconverting the input RF signal 12. The resultant RF output signal 70 is a replica of the input RF signal with some important differences.

The digital sampling process results in spurious signals or spurs at certain locations in the output spectrum of the RF output 70. The location of the spurs depends on the number of bits or bit rate of the A/D converter 34. Similarly the number of phase states of the phase modulator 24 determines which harmonics are not removed from the spectrum. If the number of phase states of the phase modulator 24 and the sampling rate of the A/D converter 34 are properly selected, as herein after described with respect to FIG. 2, the output spectrum of the output RF. will be free of any harmonic spurs caused by the digital sampling process.

The two memories 38 and 40 provide simultaneous READ/WRITE capability for the DRFM because the memories 38 and 40 may be separately addressed for writing and reading depending on the position of the switches 42 and 58. For example, if the switches 42 and 58 are configured as shown in FIG. 1, the memory 40 is in a WRITE mode while the memory 38 is in a READ mode. When the switches are reversed the memories reverse modes. The system controller 48 governs the mode of the memories 38, 40 and the configuration of the switches 42,58.

In the embodiment illustrated, the LO signal 22 is coupled to the I & Q mixers via a power divider 76 and the phase modulators 24-74. It is thus necessary to employ a decorrelation modulation controller 78 to separately control the decorrelation modulation appearing at each modulator 24 and 74, as shown. In a system employing only a single digital memory (e.g., 38) per channel 25,26 a single modulator (e.g., 24) may be placed in the LO path 22 before the power divider 76.

Decorrelation modulation controller 78 controls the modulators 24,74 which produce the modulation patterns on the respective modulated LO signals 16 and 17. It must duplicate the modulation used during signal input when it is time for that signal to be output. This can be accomplished by providing decorrelation controller 78 with respective input decorrelation coder 80 and output decorrelation coder 82 which produce identical coded outputs 84,86. For the phase modulators 24,74, which are preferably identical, the decorrelation coders 84,86 may be identically programmed addressable free running programmable read only memories (PROM), as shown, which are known in the art.

The LO signal 22 is continuously modulated by the phase modulator 24 which is controlled by the data output of coder or PROM 80. The addresses of the PROM 80 are stepped through by means of a clock (not shown). Upon the detection of an incoming RF pulse by detector 85, the current address of the free running PROM 80 is stored. This address is then used to initialize the PROM 82 when the memory 38 or 40 is asked to transmit digital data to the D/A converter 56. Thus, the same modulation will then be impressed on modulator 72 to produce modulated LO signal 74 in the upconversion, as was used in the downconversion. The decorrelation code on the modulated LO signal 72 and the output IF 66 should have proper synchronization alignment. The output PROM 82 may be left to free run until another transmit request reinitializes it. Allowing the output modulator 74 to continuously modulate the output LO signal offers the advantage of reducing the LO leakage power through the output mixer 68.

Frequency offsets can be summed in a summer 84, including false doppler values, onto the decorrelation code 86, and hence onto the replicated RF signal 70. The system controller 40 can modify the data to the output modulator 74 thereby producing a doppler frequency offset. This can be accomplished in both the PM and FM decorrelation modulation schemes.

It should be understood that the phase modulators 24,74 described herein modulate the LO signal 22 produced by the LO 20. However, although it is not specifically shown, it should be readily apparent to one skilled in the art that the LO 20 itself may be subjected to a modulating input waveform. In such a case the LO output 22 is modulated thereby producing the same result. See, for example, the Weigand patent referred to above.

Reference is directed to FIG. 2A where an output spectrum 90 of an I & Q DRFM is illustrated. The spectrum 90 includes the output RF 70 which is a replica of the input RF signal 12, LO leakage 92, an image signal 94 which is the compliment of the fundamental signal 70 and the various odd harmonic spurs 96 of the output RF signal 70. The decorrelation modulation induced on each of the spurious signals 96 is dependent upon what particular harmonic it is to the original analog IF signal 18 (FIG. 1). The spurious harmonic signals 96 of the fundamental 70 receive a modulation multiplier 98 of their harmonic number 100 minus one. For example, the fifth harmonic 102 (+5) receives a modulation multiplier 98 of four(4). The decorrelation modulation which appears on the fifth harmonic 102 has four times the modulation of the original modulation placed on the LO signal 92. The third harmonic 104, which is on the opposite side of the LO 92 in relation to the fundamental 70, receives a modulation multiplier 98 of minus four ie: $-3-1=-4$. The decorrelation phase or frequency modulation induced on this third harmonic 104 is $-4$ times the original modulation on the LO signal 92. All the modulation multipliers 98 of the odd harmonics 100 are even numbers as illustrated.

When using phase modulators 24,74 (FIG. 1) to implement decorrelation, care must be taken in the choice of the number of bits of resolution of the phase shifter (not shown) in each modulator 24,74. The table 106 shows the phase shifter bits 108 resulting in elimination of various spurs 96. For example, in the table 106, a two bit 110, phase shifter yields phase shifts in 90° increments. When this 90° increment is multiplied by a modulation multiplier 98 of four, (90°×4), the result is a 360° or 0° phase shift, i.e., zero or no modulation. The spurs which are eliminated by the phase modulator decorrelation technique of FIG. 1 are shown in FIG. 2 by the table of x's 106 for a number of different phase shifter bits. Thus, none of the harmonics 96 are eliminated. A three bit 113 phase shifter shifts in 45° increments. Thus, the harmonics multiplied by eight, i.e. 8×45°=360° are not eliminated as shown in line 110 of table 106.

When FM decorrelation modulation is used all the spurs have the same modulation multipliers 98 as before, but now just the magnitude of the frequency deviation is multiplied. The bandwidth of the fifth harmonic 102 will be four times wider than the original LO modulation. FM spur decorrelation is theoretically much more effective than PM decorrelation, but FM is more difficult to implement with hardware in a manner that provides accurate reproduction after the programmed delay. It should be understood that both PM and FM may be employed together to produce a decorrelation waveform.

Directly below the abscissa in FIG. 2B (and above table 106) is a table 112 of x's that shows which spurs are eliminated when using different numbers of phase sampling states 114 in the A/D converter. For example, in a three bit sampler resulting in eight phase states ($2^b$=Number of States) spurs 96 occur at every other harmonic number 100. See line 116. Thus, bit sampling resulting in twelve states line 118 results in spurs every third harmonic number 100.

In accordance with the invention, the number of A/D states 114 (Table 112) and the number of phase modulator bits 108 (Table 106) 96 may be selected in order to eliminate as many of the harmonics as possible. For example, when the combination of twelve phase sample states, line 118, (Table 112) and four bit, line 120, (Table 106) phase decorrelation modulation is selected (shown by the connecting arrows 122 on the right hand side of FIG. 2B), all harmonics 96 between harmonic numbers $-31$ and $+33$ are eliminated. Thus the combination of multibit phase sampling and multibit phase decorrelation provides an extraordinarily clean DRFM RF output.

While the invention has been described in connection with specific embodiments thereof, it will be understood that it is capable of further modifications. This application is intended to cover any variations, uses or adaptations of the invention following, in general, the principles of the invention, and including such departures from the present disclosure as come within known and customary practice within the art to which the invention pertains.

What is claimed is:

1. A multibit decorrelated spur digital radio frequency memory (DRFM) for replicating an analog RF input signal without significant spurious signals (spurs) over a given range of harmonics of said RF signal, said DRFM suitable for use as a coherent RF memory (CRFM) in a military electronic countermeasures system comprising:
   an RF local oscillator (LO) for producing a local oscillator mixing signal;
   a first mixer for mixing the RF and the LO signals in order to convert the RF input signal into an analog intermediate frequency (IF) signal representative of the RF signal;
   at least one multibit sampling means for sampling the IF signal at a selected bit rate to thereby convert the analog IF signal into digital values representative of the RF signal;
   digital memory means for storing the digital values representative of the RF signal for later retrieval therefrom;
   at least one digital-to-analog (D/A) converter for converting the retrieved digital values into a retrieved analog IF signal;
   a second mixer for converting the retrieved IF signal into an RF signal which is a replica of the input RF signal;
   modulating means for modulating the LO signal with a decorrelation waveform when the LO signal is mixed with the RF input signal and when the LO is mixed with the retrieved IF signal; and
   control means for controlling the modulation means and the number of bits of the sampling means such that over the range of harmonics, spurs are produced only at harmonics corresponding to the selected number of bits of the sampling means and the modulation means is sufficient to decorelate at least the spurs produced as a result of said selected number of sampling bits.

2. The DRFM of claim 1 comprising filter means for filtering the IF input signal and the retrieved IF signal.

3. The DRFM of claim 1 comprising at least one channel.

4. The DRFM of claim 1 wherein the sampling means comprises at least one of an amplitude sampling analog to digital (A/D) converter and a phase sampling (A/D) converter.

5. The DRFM of claim 1 wherein said digital memory means comprises at least two digital memories each being selectively coupled between the sampling means for receiving the digital values and the (D/A) converter for communicating the retrieved digital values thereto.

6. The DRFM of claim 5 further comprising means for selectively coupling one of said digital memory devices for communication with the (D/A) converter and the sampling means.

7. The DRFM of claim 6 wherein the selecting means is operative to connect one digital memory to the sampling means for receiving the digital values representative of the RF signal and to connect another digital memory to the (D/A) converter to communicate retrieved digital values thereto simultaneously.

8. The DRFM of claim 1 wherein the decorrelation modulation waveform comprises at least one of a phase modulated signal and a frequency modulated signal for providing spreadspectrum noise modulation.

9. The DRFM of claim 1 comprising: decorrelation waveform controller means for controlling the occurrence of the decorrelation modulation on the LO signal at the first mixer and at the second mixer such that the modulation waveform is the same when the RF input signal is mixed to produce the IF input signal as when the retrieved IF signal corresponding thereto is mixed to produce the replica of the RF.

10. The DRFM of claim 9 wherein the decorrelation controller means comprises coding means for establishing a pattern of discrete levels on the modulation waveform when the modulated LO signal is imposed on the first mixer and for establishing the same pattern on the modulation waveform when the modulated LO signal is imposed on the second mixer.

11. The DRFM of claim 10 wherein the coding means comprises a programmable read only memory (PROM) for storing the discrete pattern for modulating the LO signal at the first mixer and a PROM for storing the same discrete pattern for modulating the LO signal at the second mixer.

12. The DRFM of claim 11 wherein the modulation controlling means includes means for controlling the occurrence of the modulation pattern on the LO signals for timing storage and retrieval of the decorrelation modulation codes.

13. The DRFM of claim 9 wherein the decorrelation controller means comprises coding means for establishing a continuous pattern of on the modulation waveform when the modulated LO signal is imposed on the first mixer and for establishing the same pattern on the modulation waveform when the modulated LO signal is imposed on the second mixer.

14. A method of storing an RF signal in a multibit decorrelation digital radio frequency memory (DRFM) suitable for use as a coherent radio frequency memory (CRFM) and retrieving a replica of the RF signal at some programmed later time, while preserving the frequency and amplitude characteristics thereof, comprising the steps of:

modulating a local oscillator (LO) signal with a modulation waveform having a selected number of states;

mixing the modulated LO signal with the RF to produce an intermediate frequency (IF) signal representative of the RF input;

digitally sampling the IF signal on a multibit basis at a selected bit rate to produce digital values representative of the RF input;

storing the digital values in a digital memory;

retrieving the digital values from the digital memory at a later time;

converting the retrieved digital values to a retrieved analog IF signal on a multibit basis at said selected bit rate;

mixing the retrieved IF With the modulated LO signal having the same states for producing a replica of the RF signal; and selecting the number of states for modulating the LO signal and the number of sampling bits of sampling step such that over the range of harmonics spurs are produced only at harmonics corresponding to the selected number of sampling bits and the selected number of states of the modulation means is sufficient to decorrelate at least the spurs produced as a result of said selected number of sampling bits.

15. The method of claim 14 further comprising the steps of: selecting the number of bits for sampling the IF signal and converting the retrieved digital values into the retrieved IF signal.

16. The method of claim 14 further including the step of: selecting at least one channel for storing and replicating the RF signal including one of a single channel and I & Q quadrature channels.

17. The method of claim 14 further including the step of: filtering the IF signal representative of the RF signal and the retrieved IF signal.

18. The method of claim 14 wherein the step of modulating the LO signal comprises imposing at least one of phase modulation and frequency modulation on the LO.

19. The method of claim 18 wherein the step of phase modulating the LO signal includes modulating said LO signal with four bit modulation.

20. The method of claim 18 wherein the step of modulating the LO signal includes the step of encoding the modulation waveform and mixing the same encoded waveform with the RF input and the retrieved IF signal.

21. The method of claim 14 wherein the step of sampling and converting on a multibit basis includes at least twelve phase states.

* * * * *